Figure 1:
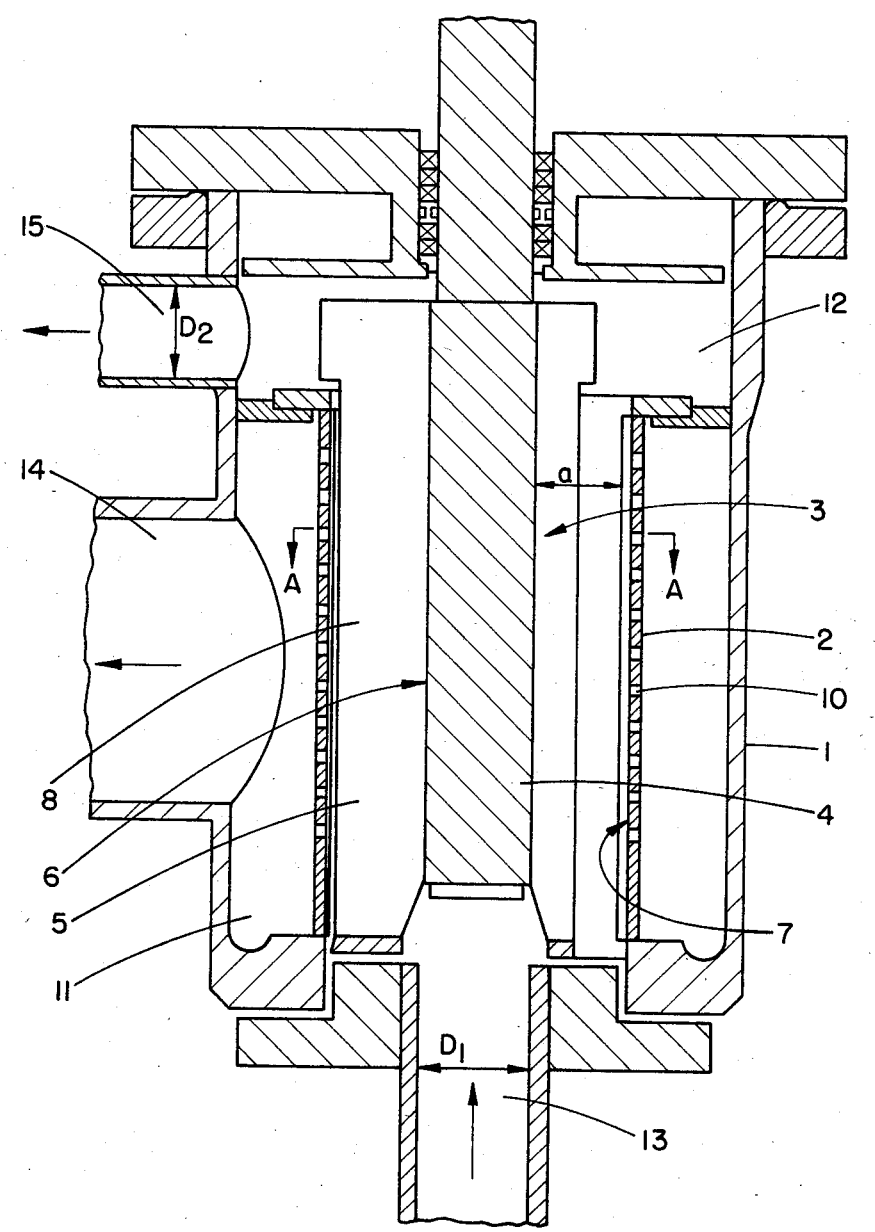

United States Patent [19]

Gullichsen

[11] Patent Number: 4,594,152

[45] Date of Patent: Jun. 10, 1986

[54] METHOD AND AN APPARATUS FOR TREATING FIBRE SUSPENSIONS

[75] Inventor: Johan Gullichsen, Siuntio, Finland

[73] Assignee: Kamyr AB, Karlstad, Sweden

[21] Appl. No.: 636,785

[22] Filed: Aug. 1, 1984

Related U.S. Application Data

[63] Continuation of Ser. No. 384,348, Jun. 2, 1982, abandoned, which is a continuation-in-part of Ser. No. 170,658, Jul. 21, 1980, abandoned, which is a continuation of Ser. No. 39,396, May 15, 1979, abandoned.

[30] Foreign Application Priority Data

Jun. 6, 1978 [FI] Finland .................................. 781789

[51] Int. Cl.$^4$ .............................................. B07B 1/04
[52] U.S. Cl. ........................................ 209/273; 162/55; 209/306
[58] Field of Search .................... 162/55; 209/273, 306

[56] References Cited

U.S. PATENT DOCUMENTS

| | | | |
|---|---|---|---|
| 2,230,647 | 2/1941 | Knight | 209/273 |
| 3,363,759 | 1/1968 | Clarke-Pounder | 209/273 |
| 3,400,820 | 9/1968 | Nelson | 209/273 |
| 3,411,721 | 11/1968 | Delcellier | 241/97 |
| 3,499,528 | 3/1970 | Salomon | 209/273 |
| 3,680,696 | 8/1972 | Morin | 209/273 |
| 4,093,506 | 6/1978 | Richter | 162/17 |
| 4,105,543 | 8/1978 | Seifert | 209/273 |
| 4,155,841 | 5/1979 | Chupka et al. | 209/273 |

*Primary Examiner*—Peter Chin
*Attorney, Agent, or Firm*—Bucknam and Archer

[57] ABSTRACT

An apparatus for treating a fibre suspension in a liquid to remove therefrom solid foreign particles. The apparatus has an inlet for receiving inflowing fibre suspension mixed with solid foreign particles; a first outlet for discharging part of the suspension liquid and said solid foreign particles; a screen positioned to define a filtering enclosure extending between said inlet and first outlet; a rotor disposed within said filtering enclosure for rotation therein to apply to the suspension fluidizing forces breaking up interlocked fibre flocs present therein and thereby fluidizing a part of said suspension to exit therefrom through said screen; and a second outlet communicating with the exterior of said screen to allow exit of fluidized suspension. The rotor has a plurality of radially extending blades supported by a central shaft, and the screen has a plurality of radially extending ribs inwardly directed to a predetermined clearance with said radially extending blades to thereby establish fluidizing forces acting upon the suspension.

8 Claims, 7 Drawing Figures

METHOD AND AN APPARATUS FOR TREATING FIBRE SUSPENSIONS

This application is a continuation of application Ser. No. 384,348 filed June 2, 1982 abandoned which application is a continuation-in-part of U.S. Ser. No. 170,658 filed on July 21, 1980 abandoned, which application is a continuation of U.S. Ser. No. 039,396, filed May 15, 1979 abandoned.

An object of the invention is to provide a new and improved screening apparatus which is particularly adapted to be connected to the blow line of a pulp digester, i.e. the line through which the cellulosic material which has been treated in the digester is discharged at a consistency of 7 to 13%. As the pulp usually contains foreign matter, such as stones and other large solid particles, screening of the pulp causes trouble in screening apparatuses of the prior art.

An other object of the invention is to provide a new and improved screening apparatus which can be used for fine screening of pulp having a high consistency, i.e. within the range of 5 to 15%. As a major portion of the fibrous stock which is introduced in the screening apparatus is discharged as accepted pulp and only a minor portion passes through the screen chamber and travels along the whole length of the screen member to the reject space, the slow velocity of flow and the thickening of the pulp in the region of the screen member adjacent to the reject space tend to cause a layer of pulp to be formed on the screen surface and clogg the apertures in the screen member in the screening apparatus of the prior art.

Still another object of the present invention is to provide a new and improved screening apparatus which has a high specific production capacity.

The apparatus of the present invention can be used as well for coarse screening as for fine screening.

Figure 2:
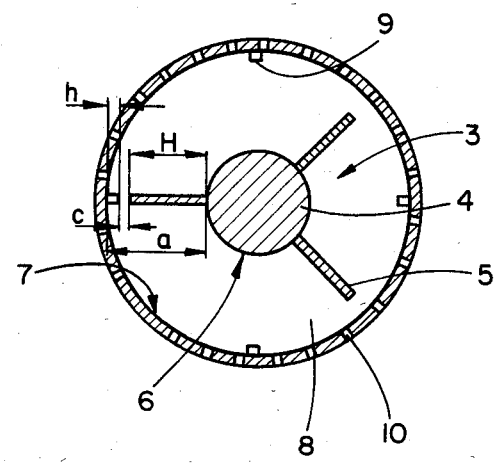
Figure 3:
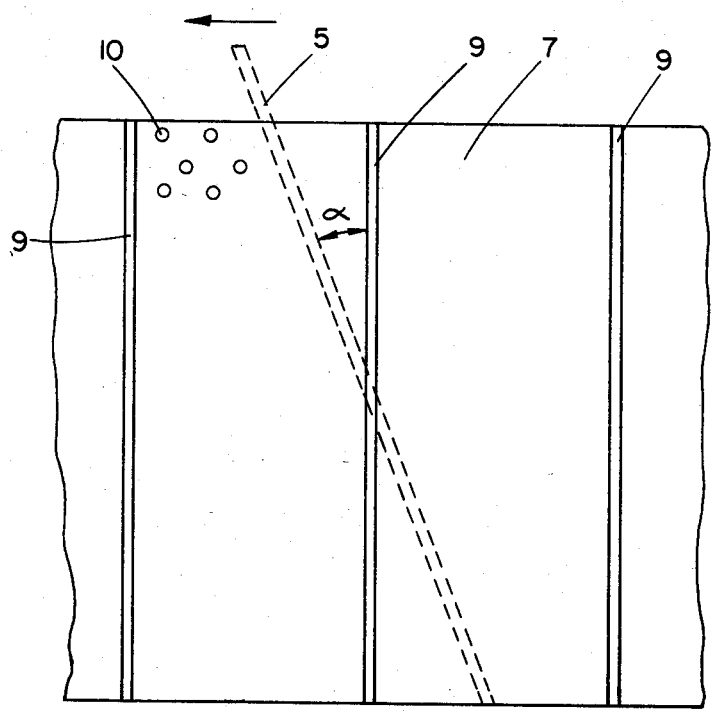
Figure 4:
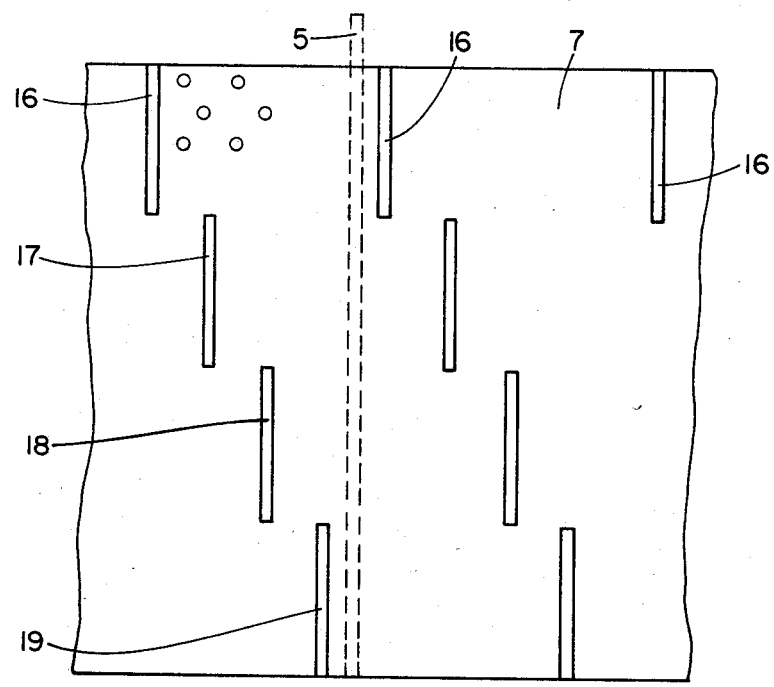
Figure 5:
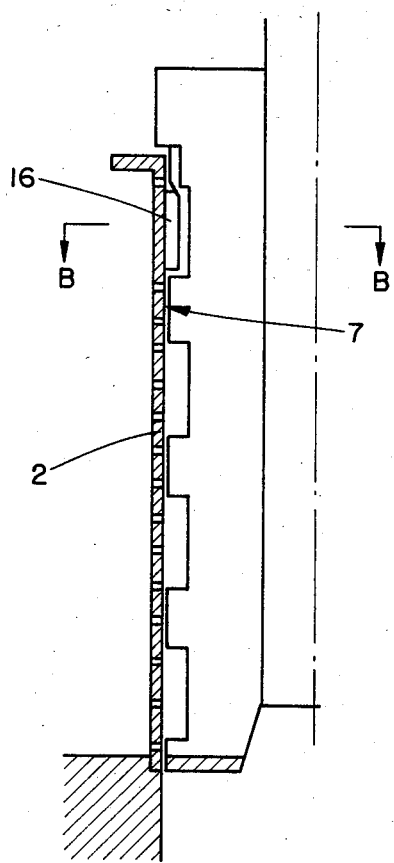
Figure 6:
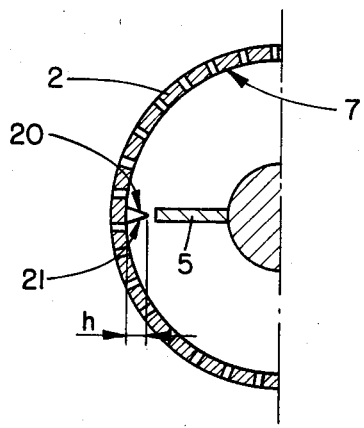
Figure 7:
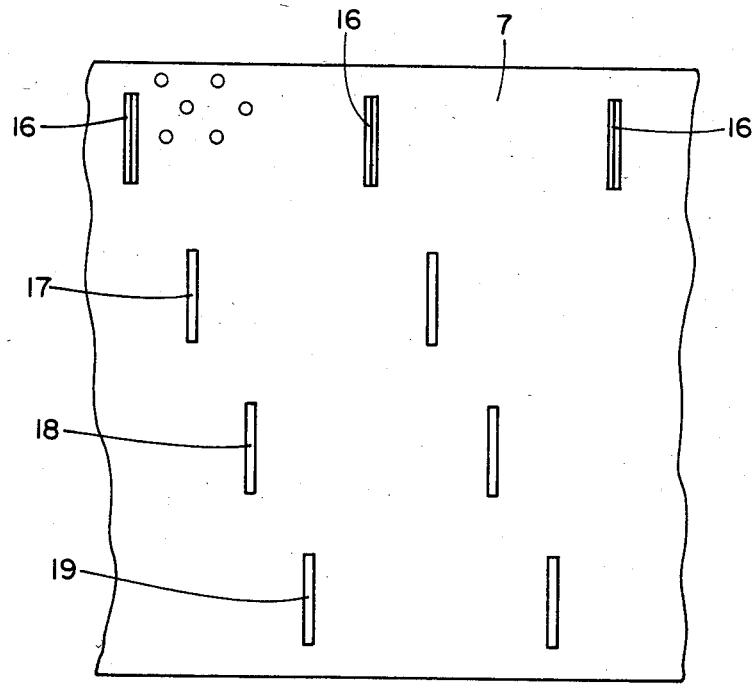

The features and advantages of the present invention will become more apparent from the following description with reference to the attached drawings in which FIG. 1 is a sectional view of one embodiment of the apparatus of the invention, FIG. 2 is a sectional view as taken on line A—A of FIG. 1, FIG. 3 is a partial unfolded view of the inside surface of the screen member of the apparatus shown in FIG. 1, FIG. 4 is a partial unfolded view of a screening surface of another embodiment of the invention, FIG. 5 is a partial sectional view of yet another embodiment of the invention, FIG. 6 is a sectional view as taken on line B—B of FIG. 5, FIG. 7 is a partial unfolded view of the inside surface of the screen member of the apparatus shown in FIG. 5.

The screening apparatus shown in FIGS. 1 to 3 includes a housing 1, a stationary cylindrical screen member 2 positioned within the housing, and a rotor 3 having a shaft 4 and blades 5 located coaxially inside the screen member and rotated by any suitable means.

The rotor shaft has an external surface 6 which is preferably cylindrical and parallel to the stationary inner surface 7 of the screen member so that they form an annular passage 8 of substantially constant width a. The length of the rotor blades is preferably slightly greater than that of the screen member so that the ends of the rotor extend beyond the screen member.

The internal surface 7 of the screen member is provided with axially extending rib-formed protrusions 9 spaced substantially evenly about the circumference of the screen member. The blades 5 radiating outwardly from the surface 6 of the rotor shaft are spaced substantially evenly about the circumference of the rotor shaft and are preferably inclined at an angle $a$, e.g. 5° to 30° to the axis of the rotor as shown in FIG. 3 in order to subject the fibrous stock that is introduced in the annular passage 8 to a driving force.

The height h of the rib-formed protrusions 9 is substantially smaller that the height H of the rotor blades 5 and the radial distance c between the outer ends of the protrusions and the outer ends of the blades is small so that the ends of the blades will move close to the inner surface 7 of the screen member when the rotor is rotated.

The screen member is provided with a plurality of apertures 10 disposed between the protrusions 9 of the inner surface 7.

The space between the housing 1 and the outer surface of the screen member 2 forms an accept chamber 11. The housing additionally includes a structure for defining a reject chamber 12 adjacent to the outlet end of the rotor. The housing has an inlet port 13 allowing fibrous stock to be introduced into the interior of the screen member, an outlet port 14 for the accepted stock, connected to the accept chamber and a discharge port 15 for the rejected portion of the stock, connected to the reject chamber.

The distance a between the outer surface of the rotor shaft and the outer edge of the protrusions on the inner surface of the screen member, and the diameter $D_2$ of the discharge port 15 are large, preferably substantially as large as the diameter $D_1$ of the inlet port 13, e.g. 100 to 150 mm, in order to allow large, hard, solid bodies which are discharged through the blow line of a digester to pass through the screening apparatus without causing damages to the structures or plugging the screening apparatus.

The distance c between the outer ends of the protrusion 9 and the blades 5 is on the order of 1 mm. The height h of the protrusions 9 is on the order of 3 mm.

The apparatus according to FIGS. 1 to 3 functions as follows:

Fibrous stock introduced through inlet port 13 flows into the annular space 8 between the moving outer surface of rotor 3 and the stationary inner surface of the screen member 2. The interaction between the moving rotor blades 5 and the protrusions 9 on the inner surface of the screen member cause shear forces and turbulence which fluidizes the stock. The ends of the blades moving at a short distance from the inner surface of the screen member prevent the formation of a layer of fibrous material on the screen surface and the clogging of the apertures of the screen member. They also interact with the apertured surface to bring about turbulance in the stock and maintain fluidization of the stock. As the distance c between the ends of the protrusions and the blades is small a field of hydraulic shear stresses is generated close to the inner surface of the screen member and affects even small fiber flocks. The fibers which can pass the apertures in the screen member are withdrawn from the fluidized stock through the apertures 10 to the accept chamber 11 and discharged through the outlet port 14. The remaining portion of the stock flows through the annular passage 8 to the reject chamber 12 and is discharged through discharge port 15. Large solid bodies can pass from the inlet port to the discharge port through the annular passage without damaging the screen structures. FIG. 4 shows an alternative embodiment of the screen member in which the inner surface 7 is provided with a plurality of sets of axially extending protrusions 16, 17, 18, 19 spaced substantially evenly about the circumference which are arranged so that they form a staggered configuration. The protrusions in each set are offset circumferentially relative to the protrusions in the adjacent set, i.e. the protrusions are axially arranged so that each set of protrusions extends substantially to the region of the adjacent set of protrusions. The blades 5 of the rotor are preferably arranged in an axial direction.

In the embodiment shown in FIGS. 5, 6 and 7 the inner surface 7 of the screen chamber 2 is provided with a set of axially extending protrusions 16, 17, 18, 19 which are offset axially and circumferentially relative to the protrusions in the adjacent set. The protrusions have two substantially plane surfaces 20, 21 inclined to the wall of the rotor. The outer end of the blades 5 of the rotor runs close to the protrusions and to the inner surface of the screen member in the region between the sets of protrusions. This arrangement renders it possible to use protrusions having a greater height h than in the embodiment of FIGS. 1 to 3, e.g. 25 mm, which are more effective in bringing about radial flow components and in spite of that produce hydraulic shear stresses close to the inner surface of the screen member.

Various alternative embodiments can be adapted without departing from the scope of the invention. In particular, the protrusions 9, 16, 17, 18, 19 on the inside surface of the screen member can be inclined to the axis of the screen member at an angle of e.g. 5° to 30°.

What is claimed is:

1. An apparatus for fluidizing and screening a fibre suspension of consistency 5–15% to remove therefrom solid foreign particles, which apparatus comprises a housing, an inlet in the housing for receiving inflowing fibre suspension mixed with solid foreign particles; a first outlet in the housing for discharging part of the suspension liquid and said solid foreign particles; a stationary screen positioned in the housing to define a filtering enclosure extending between said inlet and said first outlet, the screen having an inner surface and a plurality of apertures, a rotor disposed within said filtering enclosure for rotation therein to apply to the suspension fluidizing forces breaking up interlocked fibre flocs present therein and thereby fluidizing a part of said suspension to exit therefrom through said screen; a second outlet communicating with the exterior of said screen to allow exit of fluidized suspension; said rotor having a plurality of radially extending planar blades supported by a central shaft, said blades having an outer edge, said blades extending continously towards the inner surface of the screen, from the rotor shaft, said screen having a plurality of radially extending ribs inwardly directed to a predetermined clearance with the outer edge of said radially extending blades, each of said ribs having an outer end, said blades having a height greater than the height of said ribs, the height of the blades being such that said predetermined clearance is sufficient to establish fluidizing forces acting upon the suspension, and wherein said first outlet is approximately the same size as said inlet to accommodate exit of said solid foreign particles.

2. The apparatus according to claim 1 wherein said ribs are offset circumferentially and axially to each other.

3. The apparatus according to claim 1 wherein the ribs are tapered.

4. The apparatus according to claim 1 wherein said rotor blades are inclined with respect to the axis of said shaft at an angle of 5°–30°.

5. The apparatus according to claim 3 wherein said ribs are offset circumferentially and axially to each other.

6. An apparatus according to claim 1 wherein said predetermined clearance between said ribs and blades is approximately 1 mm.

7. The apparatus according to claim 1 wherein said ribs that extend into axial recesses of the rotor blades.

8. The apparatus according to claim 1 wherein the axial length of said rotor blades is such as to extend same beyond said screen.

* * * * *